(12) United States Patent
Kubinski et al.

(10) Patent No.: US 12,091,999 B2
(45) Date of Patent: Sep. 17, 2024

(54) SYSTEM AND METHODS FOR ADJUSTING NH$_3$ SENSOR DRIFT

(71) Applicant: Ford Global Technologies, LLC, Dearborn, MI (US)

(72) Inventors: David Kubinski, Canton, MI (US); Michiel J. Van Nieuwstadt, Ann Arbor, MI (US); In Kwang Yoo, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 17/450,247

(22) Filed: Oct. 7, 2021

(65) Prior Publication Data
US 2023/0112942 A1   Apr. 13, 2023

(51) Int. Cl.
*F01N 11/00*   (2006.01)
*B01D 53/94*   (2006.01)
*F01N 3/021*   (2006.01)
*F01N 3/20*   (2006.01)

(52) U.S. Cl.
CPC .......... *F01N 11/00* (2013.01); *B01D 53/9418* (2013.01); *B01D 53/9431* (2013.01); *B01D 53/9495* (2013.01); *F01N 3/021* (2013.01); *F01N 3/208* (2013.01); *F01N 2550/02* (2013.01); *F01N 2610/02* (2013.01); *F01N 2610/1453* (2013.01); *F01N 2900/1402* (2013.01)

(58) Field of Classification Search
CPC ............ B01D 53/9418; B01D 53/9431; B01D 53/9495; F01N 11/00; F01N 2550/02; F01N 2560/021; F01N 2560/026; F01N 2610/02; F01N 2610/1453; F01N 2900/1402; F01N 3/021; F01N 3/2066; F01N 3/208; Y02A 50/20; Y02T 10/12
See application file for complete search history.

(56) References Cited

U.S. PATENT DOCUMENTS

| 9,080,488 B2 | 7/2015 | Upadhyay et al. |
| 9,206,722 B2 | 12/2015 | Wittrock et al. |
| 10,408,807 B2 | 9/2019 | Hollauf et al. |
| 10,738,677 B2 | 8/2020 | Zhang |
| 2020/0088665 A1* | 3/2020 | Takizawa ............. G01N 31/223 |

FOREIGN PATENT DOCUMENTS

DE    102019206680 A1    11/2020

* cited by examiner

*Primary Examiner* — Phutthiwat Wongwian
*Assistant Examiner* — Diem T Tran
(74) *Attorney, Agent, or Firm* — Vincent Mastrogiacomo; McCoy Russell LLP (57) ABSTRACT

Methods and systems are provided for adjusting an ammonia (NH$_3$) sensor output using readings of a nitrogen oxide (NOx) sensor, the NOx sensor having a sensitivity factor to NH$_3$. In one example, a method may include determining and updating a gain value of the NH$_3$ sensor during zero NOx conditions to be used to calculate a corrected NH$_3$ sensor output value, and determining and updating an offset value of the NH$_3$ sensor during zero NH$_3$ conditions to be used to zero the NH$_3$ sensor during zero NOx conditions.

15 Claims, 5 Drawing Sheets

SYSTEM AND METHODS FOR ADJUSTING NH₃ SENSOR DRIFT

FIELD

The present description relates generally to methods and systems for adjusting an output of an ammonia ($NH_3$) sensor of a vehicle exhaust system using an output of a nitrogen oxide (NOx) sensor positioned in proximity to the $NH_3$ sensor in the vehicle exhaust system.

BACKGROUND/SUMMARY

Nitrogen oxides (e.g., NOx) may be present in exhaust gases of a vehicle. NOx may form in engine cylinders when nitrogen ($N_2$) and oxygen ($O_2$) are exposed to elevated temperatures and pressures. NOx may be processed via a selective catalytic reduction (SCR) system in the vehicle's exhaust system into $N_2$ and $H_2O$. The SCR system may co-operate with a reductant such as ammonia ($NH_3$) injected in the form of urea onto the SCR system to reduce the NOx when there is sufficient temperature within the SCR system.

However, if there is an insufficient amount of $NH_3$ present at the SCR system, a higher amount of NOx than is desirable may pass through the SCR system to the atmosphere. On the other hand, if excess $NH_3$ is directed to or stored on the SCR system, $NH_3$ may slip past the SCR system. Thus, it may be desirable to provide the SCR system with an amount of $NH_3$ that reduces a desirable portion of NOx from exhaust gas, yet is small enough to inhibit $NH_3$ escape from the SCR system.

One way to provide an optimized amount of $NH_3$ to a SCR system, such that a desirable portion of NOx from exhaust gas is reduced and $NH_3$ is inhibited from escaping the SCR system, is to model the engine feedgas emissions, e.g., exhaust gas, and model operation of the SCR system. In a model based system, the $NH_3$ may be released to the SCR system (through urea injection control) based on the estimated operating state of the SCR system. However, it may be difficult to accurately estimate chemical reactions, temperatures, and similar conditions for a SCR system for a variety of reasons. As an alternative to the model approach, a NOx sensor may be placed downstream of a SCR system in an effort to determine if NOx is passing through the SCR system. However, NOx sensors may have a cross sensitivity to $NH_3$, thus, a capability of the NOx sensor may include sensing both NOx and $NH_3$, and a controller may not be able to distinguish between flow of NOx or $NH_3$ past the SCR system using the NOx sensor output.

One example approach for estimating whether a tailpipe NOx sensor is responding to either NOx or $NH_3$, or a combination of NOx and $NH_3$, is shown by Upadhyay et al. in U.S. Pat. No. 9,080,488B2. Therein, a method is disclosed for estimating slippage of NOx and/or $NH_3$ through a SCR system, where a first NOx sensor is positioned upstream of the SCR system and a second NOx sensor is positioned downstream of the SCR system, where the first NOx sensor and the second NOx sensor have cross sensitivity between NOx and $NH_3$. Signals from the first NOx sensor and the second NOx sensor are processed to provide a $NH_3$ concentration of a gas based on a time dependent correlation in phase between the signals of the two NOx sensors. However, such systems may provide inaccurate concentrations of $NH_3$ because $NH_3$ concentration is indirectly measured using an NOx sensor. Additionally, the routine used to time stamp exhaust gases and therefore correlate upstream and downstream signals may be difficult due to the dynamic nature of exhaust gas.

Another approach to optimizing an amount of $NH_3$ injected to a SCR system includes placing a $NH_3$ sensor downstream of the SCR system in an effort to determine if $NH_3$ is passing through the SCR system. The $NH_3$ sensor may not have a cross sensitivity to NOx and outputs a signal when $NH_3$ is present, regardless of an absence or presence of NOx. In one example, the $NH_3$ sensor may be a "mixed-potential" sensor that may be tunable to be selective to (e.g., sense) different gas mixtures by changing an electrode composition of or applying a voltage to the mixed-potential sensor. In another example, the $NH_3$ sensor may include other $NH_3$ sensing technology. Mixed-potential sensors as well as other conventional $NH_3$ sensing technologies may drift in their response to $NH_3$ over time, e.g., the $NH_3$ sensor accuracy may diminish over time. Drift may occur due to changes in catalytic activity of an $NH_3$ sensing electrode in the $NH_3$ sensor. For example, the $NH_3$ sensor may drift by 50% of a sensor gain in a positive or a negative direction, both of which directions may result in inaccurate $NH_3$ sensor outputs. The sensor gain is a factor by which the $NH_3$ sensor output is greater than or less than the concentration of $NH_3$ present in the exhaust gas. $NH_3$ sensor inaccuracy due to drift may result in an insufficient or an excess amount of $NH_3$ injected to the SCR system, which may reduce SCR system efficiency and result in NOx and/or $NH_3$ being released to the atmosphere. A technique is needed for improving the accuracy of the $NH_3$ sensor over time in order to provide more accurate estimates of the relative fractions of NOx and $NH_3$ in exhaust gas monitored by the NOx sensor.

The inventors herein have recognized the above-mentioned disadvantages and have developed a method for adjusting a $NH_3$ sensor output based on readings by a NOx sensor during zero NOx conditions, the NOx sensor having a sensitivity factor to $NH_3$ as a function of temperature and exhaust flow velocity. The $NH_3$ sensor and the NOx sensor operate independently and the $NH_3$ sensor is placed proximate to the NOx sensor such that the NOx sensor and the $NH_3$ sensor may be exposed to exhaust gas from the same region of an exhaust passage, which may include exhaust gas with similar compositions (e.g., percentages of NOx, $NH_3$, $O_2$, etc.). The method further calibrates the $NH_3$ sensor in two ways. A first calibration (e.g., re-spanning) includes updating the $NH_3$ sensor output based on a ratio of a NOx sensor output to a $NH_3$ sensor output. Using the NOx sensor output to re-span the $NH_3$ sensor may maintain or restore $NH_3$ sensor accuracy and allow both the NOx sensor and the $NH_3$ sensor to provide a more stable determination of NOx and $NH_3$ concentrations in exhaust gas. Additionally, during zero NOx and zero $NH_3$ conditions, a second calibration (e.g., zeroing) includes setting an $NH_3$ sensor output to zero when $NH_3$ concentration is known to be zero (e.g., during zero $NH_3$ conditions). In this way, $NH_3$ sensor accuracy may be restored and maintained as $NH_3$ sensor accuracy experiences drift over time. Restoring and maintaining $NH_3$ sensor accuracy may allow an amount of $NH_3$ injected to the SCR system as urea to be adjusted based on the $NH_3$ sensor output. This may further allow efficient injection of urea to the SCR system to assist in efficiently reducing NOx in exhaust gas while reducing NOx and $NH_3$ slip through the SCR system to the atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
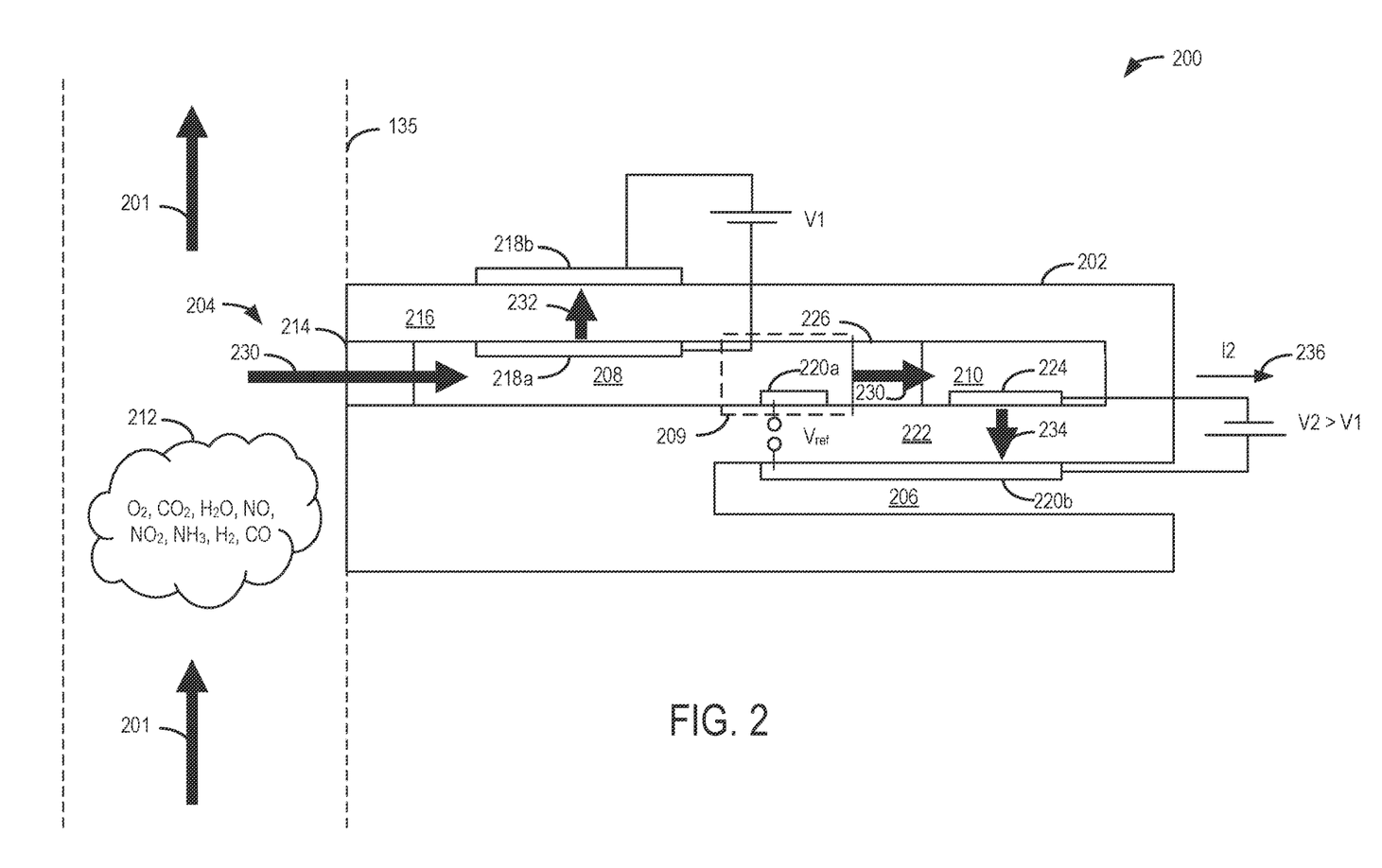
FIG. 2 shows a schematic of a nitrogen oxide (NOx) sensor which may be implemented in the engine of FIG. 1.
Figure 3:
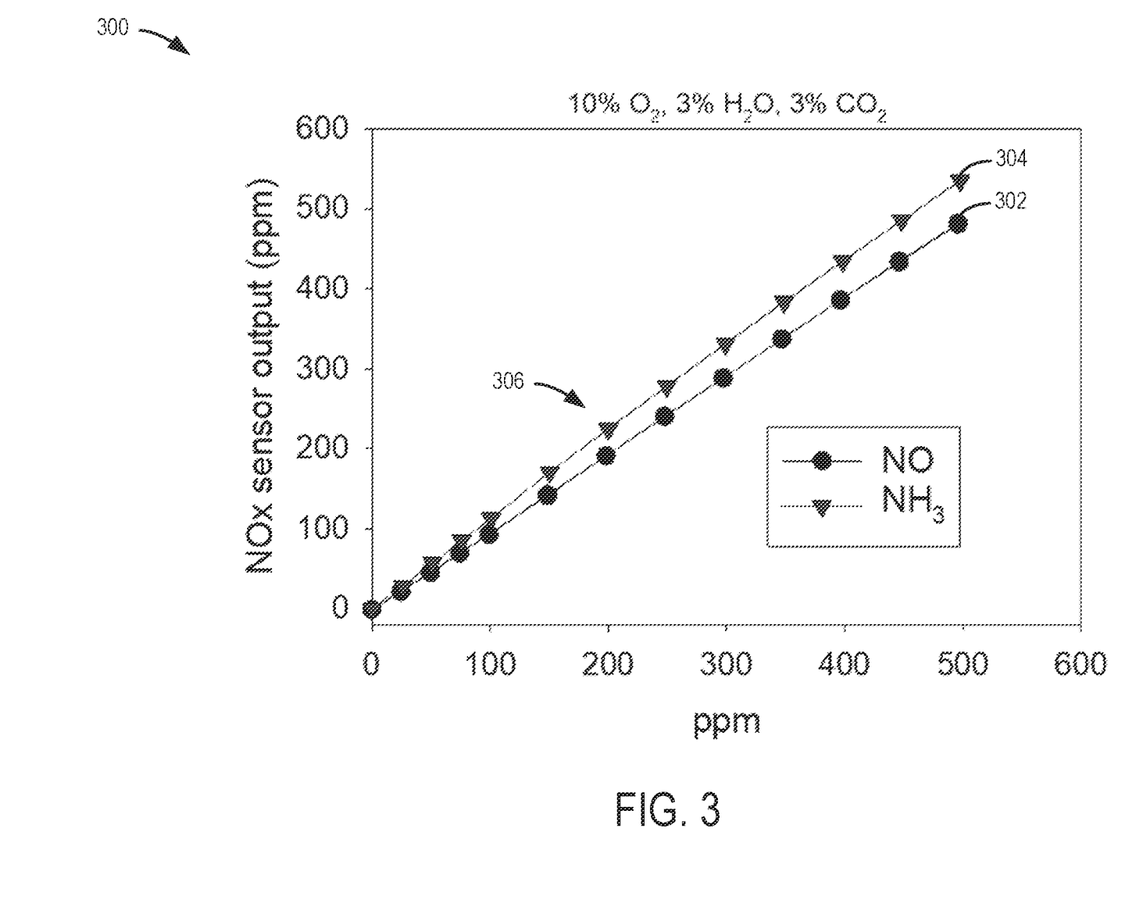
FIG. 3 shows a graph of NOx sensor sensitivity to $NH_3$ and NO.
Figure 4A:
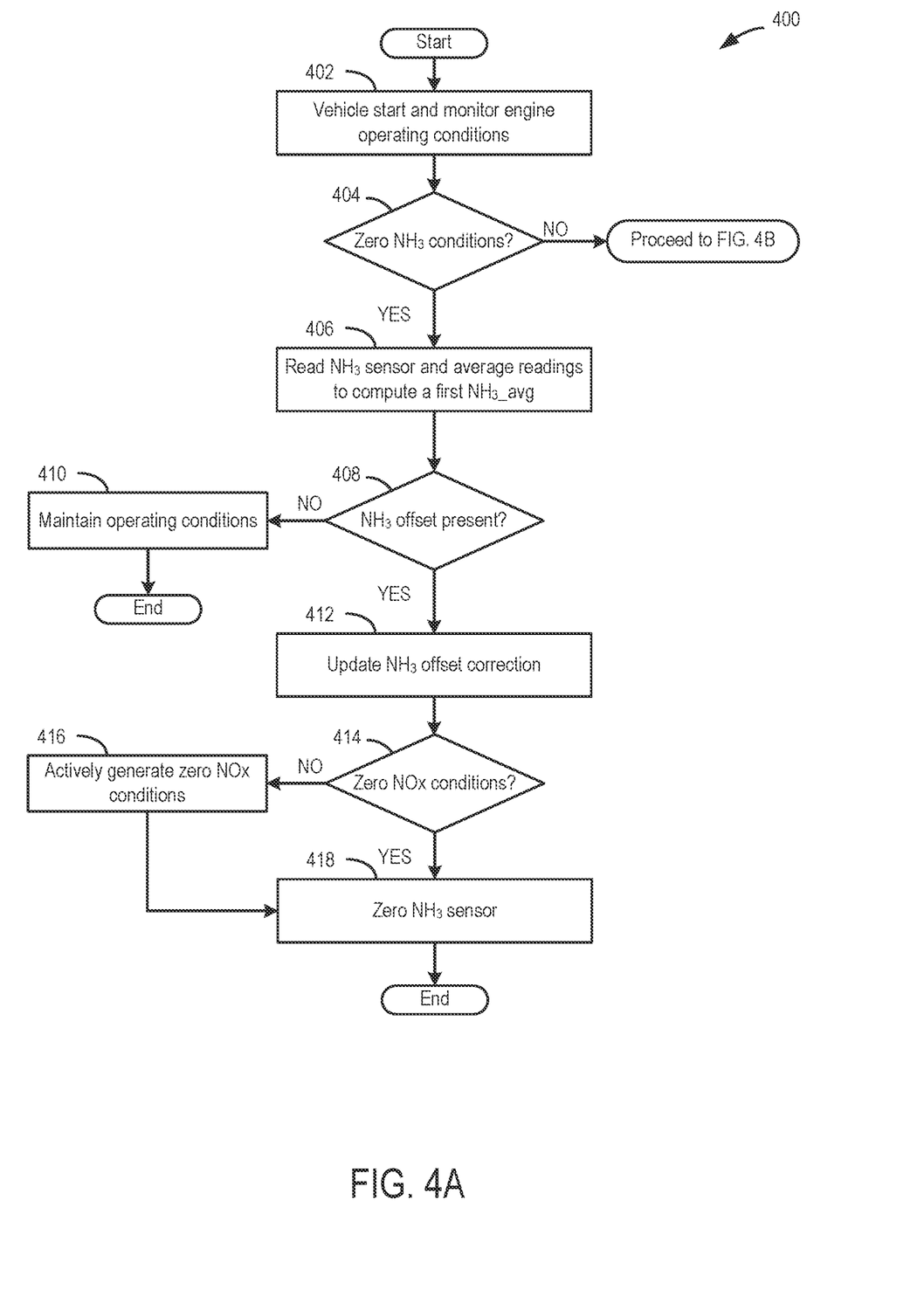
FIGS. 4A-4B show an example method for adjusting an $NH_3$ sensor output and re-spanning the $NH_3$ sensor.
Figure 4B:
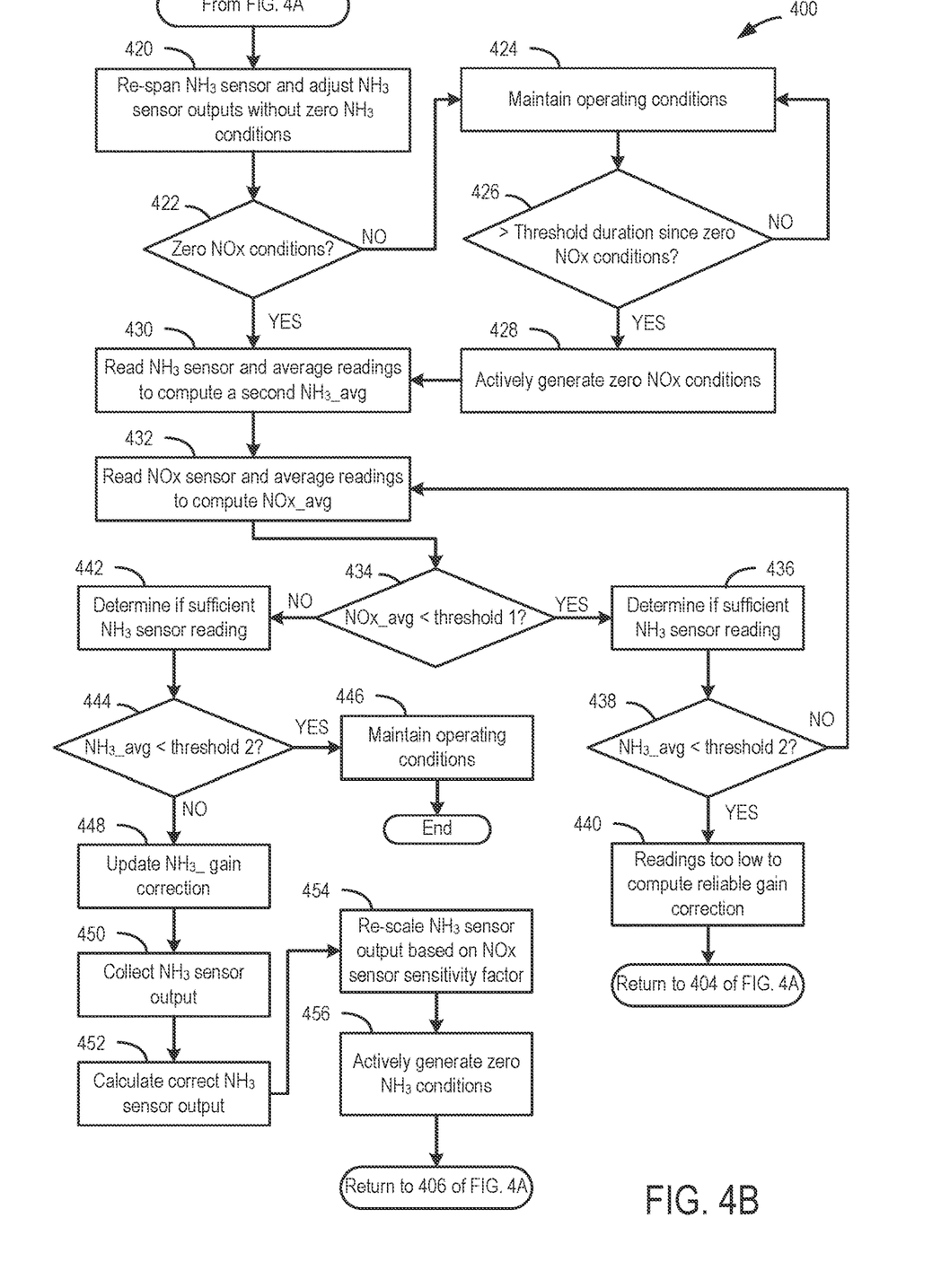

The following description relates to systems and methods for adjusting an ammonia ($NH_3$) sensor output based on readings by a nitrogen oxide (NOx) sensor during zero NOx conditions, the NOx sensor having a sensitivity factor as a function of temperature and exhaust flow velocity. The NOx sensor and the $NH_3$ sensor may be implemented in a vehicle engine system, such as the vehicle engine system of FIG. 1. The NOx sensor and the $NH_3$ sensor may be positioned downstream of a selective catalytic reduction (SCR) system of the vehicle engine system and in close proximity to each other such that the NOx sensor and the $NH_3$ sensor are exposed to exhaust gas from the same region of an exhaust passage of the vehicle engine system, which may include exhaust gas with similar compositions (e.g., percentages of NOx, $NH_3$, $O_2$, etc.). FIG. 2 shows a schematic of a NOx sensor, such as the NOx sensor implemented in the engine system of FIG. 1. The NOx sensor has a cross sensitivity to NOx and $NH_3$ such that, when $NH_3$ and NOx are present in the exhaust gas, the NOx sensor may sense both $NH_3$ and NOx and provide an output indicating a combined concentration of NOx and $NH_3$ as a NOx concentration. This may result in a controller not be able to distinguish whether a SCR system is slipping NOx or $NH_3$. The graph of FIG. 3 shows an example sensitivity of a NOx sensor, such as the NOx sensor of FIG. 2, to NO and $NH_3$. The $NH_3$ sensor may sense only $NH_3$ and a concentration of NOx in the exhaust gas may not be included in an output of thereof. However, $NH_3$ sensor technology, including mixed potential sensors and other $NH_3$ sensing technology may tend to drift over time such that output values of the $NH_3$ sensor inaccurately represent concentrations of $NH_3$ in exhaust gas. The $NH_3$ sensor output may be updated using readings of the NOx sensor during zero NOx conditions, as during zero NOx conditions, the NOx sensor may record $NH_3$ concentration without interference from NOx. FIGS. 4A-4B show a method for adjusting the $NH_3$ sensor output and re-spanning the $NH_3$ sensor during different vehicle conditions, including zero $NH_3$ conditions and conditions where $NH_3$ is present. The method of FIGS. 4A-4B may be applied to the system of FIG. 1 using the NOx sensor of FIG. 2.

Figure 1:
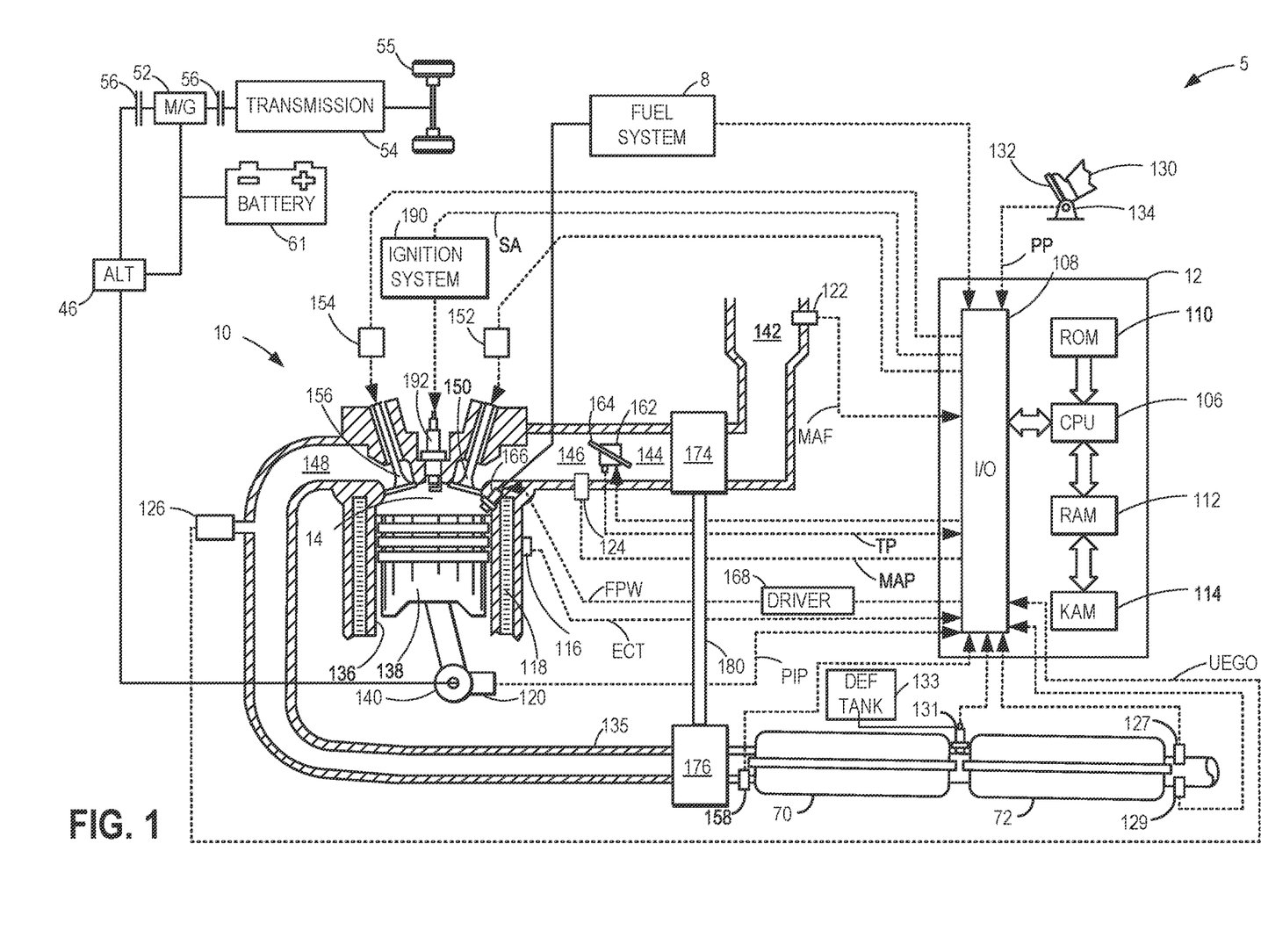
FIG. 1 shows a schematic of an engine included in a diesel vehicle.

Turning to the figures, FIG. 1 depicts an example of a cylinder 14 of an internal combustion engine 10, which may be included in a vehicle 5. In one example, engine 10 is a diesel engine that combusts air and diesel fuel through compression ignition. In other non-limiting embodiments, engine 10 may combust a different fuel including gasoline, biodiesel, or an alcohol containing fuel blend (e.g., gasoline and ethanol or gasoline and methanol) through compression ignition and/or spark ignition. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutch 56 is engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

A powertrain may be configured in various manners, including as a parallel, a series, or a series-parallel hybrid vehicle. In electric vehicle embodiments, a system battery 61 may be a traction battery that delivers electrical power to electric machine 52 to provide torque to vehicle wheels 55. In some embodiments, electric machine 52 may also be operated as a generator to provide electrical power to charge system battery 61, for example, during a braking operation. It will be appreciated that in other embodiments, including non-electric vehicle embodiments, system battery 61 may be a typical starting, lighting, ignition (SLI) battery coupled to an alternator 46.

Alternator 46 may be configured to charge system battery 61 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of a first aftertreatment device 70. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example.

In the present example, a second exhaust gas sensor 127 and a third exhaust gas sensor 129 are provided downstream of the first aftertreatment device 70. The second exhaust gas sensor 127 may be a NOx sensor and the third exhaust gas sensor 129 may be a $NH_3$ sensor, in the present example. The NOx sensor 127 and the $NH_3$ sensor 129 are positioned in close proximity to each other such that the NOx sensor 127 and the $NH_3$ sensor 129 may be exposed to the same exhaust gas compositions. For example, the NOx sensor 127 and the $NH_3$ sensor 129 are placed laterally in the exhaust passage 135. The NOx sensor 127 may be positioned in such a way that the NOx sensor 127 intakes exhaust gas from the second aftertreatment device 72 and reduces exhaust gas components, as further described in FIG. 2. The $NH_3$ sensor may be similarly positioned in the exhaust passage 135 to intake exhaust gas from the second aftertreatment device 72 and oxidizes $NH_3$ in exhaust gas using a mixed potential electrode to determine a concentration of $NH_3$ in exhaust gas. The NOx sensor 127 and the $NH_3$ sensor 129 are independently operated and are independently in communication with the controller 12.

The first aftertreatment device 70 is shown positioned in an engine exhaust system downstream of the exhaust turbine 176. The first aftertreatment device 70 may include a particulate filter and oxidation catalyst bricks, in one example. Alternatively, an aftertreatment system may include a second aftertreatment device 72 in addition to the first aftertreatment device 70, where the second aftertreatment device 72 may be configured as a SCR system. If the second aftertreatment device 72 is configured as an SCR system, exhaust gas sensor 126 may be moved to a location between the first aftertreatment device 70 and the second aftertreatment device 72. The second aftertreatment device 72 is shown located downstream of the first aftertreatment device 70 in the direction of exhaust flow and is configured as a SCR system when the first aftertreatment device 70 is configured as a particulate filter or oxidation catalyst. NOx sensor 127 is shown positioned downstream of the second aftertreatment device 72 and $NH_3$ sensor 129 is shown positioned downstream of NOx sensor 127 when the second aftertreatment device 72 is a SCR system. In alternative examples, the first aftertreatment device 70 and the second aftertreatment device 72 along with NOx sensor 127 and $NH_3$ sensor 129 may be positioned upstream of turbine 176.

A urea injector 131 is shown positioned between the first aftertreatment device 70, which may be configured as an upstream particulate filter, and the second aftertreatment device 72, which may be configured as a SCR system. The urea injector 131 is in communication with the controller 12 and may selectively inject $NH_3$ in the form of urea, also referred to as diesel exhaust fluid (DEF), onto the SCR system to act as a reductant and co-operate with the SCR system to reduce NOx in exhaust gas when there is sufficient temperature within the SCR system. DEF may be stored in a DEF tank 133, to which the urea injector 131 is coupled.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an intake actuator 152. Similarly, exhaust valve 156 may be controlled by controller 12 via an exhaust actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. For example, valve actuators may be a cam actuation type and the intake and exhaust valve timing may be controlled concurrently, and any of a possibility of variable intake cam timing, variable exhaust cam timing, dual independent variable cam timing, or fixed cam timing may be used in conjunction with multiple cam profiles or oscillating cams. In some examples, the cam actuation system may be a single cam and may utilize one or more of cam profile switching (CPS), variable cam timing (VCT), variable valve timing (VVT), and/or variable valve lift (VVL) systems that may be operated by controller 12 to vary valve operation. In one example, the cam actuation system may include additional tappets coupling the intake/exhaust valves to a camshaft where the additional tappets are configured to selectively couple and decouple the valves to and from the camshaft. In this way, actuation of the intake/exhaust valves may be enabled independent of rotation of the camshaft. In yet other examples, a camless system may be used and the actuators 152, 154 may be electronically controlled. For example, the valves may be electro-pneumatic valves, electro-hydraulic valves, or electromagnetic valves.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of a spark plug 192 included in non-diesel engines. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection. Fuel tanks in fuel system 8 may be a diesel fuel tank and hold diesel fuel for injection into the engine 10 by at least one fuel injector 166.

Controller 12, which may include a powertrain control module (PCM), is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; a signal from the NOx sensor indicating a concentration of NO and/or $NH_3$ in the exhaust gas; a signal from the $NH_3$ sensor indicating a concentration of $NH_3$ in the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of the first aftertreatment device 70 and the second aftertreatment device 72 based on the signal received from temperature sensor 158.

Controller 12 receives signals from the various sensors of FIG. 1, processes the received signals, and employs the various actuators of FIG. 1 (e.g., fuel injector 166, urea injector 131) to adjust engine operation based on the received signals and instructions stored on a memory of the controller. For example, the controller may receive a request for slowing of the vehicle based on input from the accelerator pedal (e.g., the accelerator pedal is released). In response to the request, the controller may command fuel injection at one or more cylinders to stop, thereby reducing fuel consumption during a period where torque is not demanded. In another example, the controller may receive a request for reducing or stopping urea injection to the SCR system based on input from the NOx sensor and/or the $NH_3$ sensor. In response to the request, the controller may command the urea injector to halt injection of urea on the SCR system, thereby reducing an amount of $NH_3$ used to reduce NO in exhaust gas during a period where exhaust gas may have a low NO concentration or when exhaust gas flow is low, for example.

As described above, FIG. 1 shows only one cylinder of a multi-cylinder engine. As such, each cylinder may similarly include its own set of intake/exhaust valves, fuel injector(s), etc. It will be appreciated that engine 10 may include any suitable number of cylinders, including 2, 3, 4, 5, 6, 8, 10, 12, or more cylinders, referred to in the following description as a plurality of cylinders. Further, each of these cylinders can include some or all of the various components described and depicted by FIG. 1 with reference to cylinder 14.

Thus, the system of FIG. 1 provides for an engine system, comprising an engine, a NOx sensor, a $NH_3$ sensor, and a controller. In one example, the engine may be configured as a diesel engine and the vehicle may be an all diesel vehicle or a hybrid electric vehicle. When configured with a diesel engine, the engine system further includes a particulate filter and a SCR system as the aftertreatment devices. The NOx sensor and the $NH_3$ sensor may be included in the engine system to measure an amount of NOx and $NH_3$ that passes through the SCR system to the atmosphere. It is desirable to reduce an amount of NOx and $NH_3$ released to the atmosphere, therefore outputs of the NOx sensor and the $NH_3$ sensor may be used by the controller to adjust an amount of $NH_3$ injected into the SCR system to efficiently reduce a present concentration of NOx. However, the NOx sensor may have cross-sensitivity to NOx and $NH_3$, as further described in FIGS. 2-3, and may provide an output indicating a combined concentration of NOx and $NH_3$ as a NOx concentration. This may result in a controller not be able to distinguish whether a SCR system is slipping NOx or $NH_3$.

Referring now to FIG. 2, an example schematic of an amperometric nitrogen oxide (NOx) sensor 200 is shown. The NOx sensor 200 may be an example of the sensor 127 of FIG. 1 when the engine 10 is a diesel engine. The NOx sensor 200 may be positioned in an exhaust flow path, as shown by arrows 201, of an exhaust passage, such as the exhaust passage 135 of FIG. 1, such that exhaust gas flows into the NOx sensor 200, as shown by arrows 230.

The amperometric NOx sensor 200 may be based on electrochemical oxygen sensors used in gasoline applications. The sensor 200 is configured with a body 202 composed of an oxygen ion-conducting material. In the example of sensor 200, the body 202 is composed of yttria-stabilized zirconia (YSZ), an electroceramic with ion-conducting properties. Other examples of sensor 200 may be configured with other ion-conducting materials. In one example, the body 202 has a sinuous shape with gap regions between turns of the body 202 where the gap regions may be formed of materials different from materials of the body 202 or exposed to air. Gap regions include a first region 204 and a second region 206, where the first region 204 is positioned above the second region 206, and the first region 204 and the second region 206 are separated by the body 202. The first region 204 may be exposed to exhaust gas from the exhaust passage 135 and the second region 206 may be exposed to air.

The first region 204 may be comprised of a first cell 208 and a second cell 210 for processing and determining a composition of a volume of exhaust gas 212. The first cell 208 may reduce the exhaust gas and pump resulting oxygen out of the NOx sensor. The first cell 208 may include a region, referred to as a reference cell, downstream of a first pair of electrodes in a direction of exhaust gas flow, which uses a second pair of electrodes to measure a residual concentration of oxygen not pumped out by the first cell 208. The second cell 210 may pump residual oxygen out of the NOx sensor. Functions of the first cell 208 and the second cell 210 are further described below. The first cell 208 and the second cell 210 may be a hollow space (e.g., an empty space surrounded by walls on four sides and on each of two ends) isolated from an exhaust system, as further described below, such as the exhaust system of FIG. 1. In the example of FIG. 2, the first cell 208 and the second cell 210 are arranged in series along a path of exhaust gas flow through the exhaust system, as shown by arrows 230. The first cell 208 may be separated from the exhaust passage 135 by a first diffusion barrier 214. A first segment 216 of the body 202 bordering a top of the first cell 208 and a top of the second cell 210 may be configured with a first pair of electrodes including a first electrode 218a positioned in the first cell 208 and a second electrode 218b positioned opposite the first electrode 218a on the other side of the first segment 216 of the body 202. In the example of NOx sensor 200, the first electrode 218a and the second electrode 218b are platinum electrodes. The first pair of electrodes may have a first voltage V1 applied thereto to pump oxygen out of the NOx sensor 200. In one example, V1 may be between −200 mV and −400 mV.

The first cell 208 may also include a reference cell 209 region configured with a second pair of electrodes, positioned downstream of the first pair of electrodes in the direction of exhaust gas flow, including a third electrode 220a positioned in the first cell 208 and a fourth electrode 220b positioned opposite the third electrode 220a on the other side of a second segment 222 of the body 202 in the second region 206. In the example of NOx sensor 200, the third electrode 220a and the fourth electrode 220b are platinum electrodes. The second segment 222 of the body 202 may border a bottom of the first cell 208 and a bottom of the second cell 210, as well as a top of the second region 206. A reference voltage $V_{ref}$ may be generated by the second pair of electrodes and may be measured to determine a residual concentration of oxygen remaining in the first cell 208 (e.g., not pumped out by the first pair of electrodes). $V_{ref}$ may be adjusted to a constant value by adjusting the voltage V1, thus allowing a constant concentration of residual oxygen to remain in the first cell 208 by adjusting the concentration of oxygen pumped out of the first cell 208 by the first pair of electrodes.

The second cell 210 may be configured with a third pair of electrodes including the fourth electrode 220b and a fifth electrode 224 opposite the fourth electrode 220b, the fifth electrode 224 positioned in the second cell 210. For example, the fourth electrode 220b may be shared by the first cell 208 and the second cell 210. In the example of NOx sensor 200, the fifth electrode 224 is a nitric oxide (NO) decomposition electrode. The fourth electrode 220b and the fifth electrode 224 may have a constant second voltage V2 applied thereto, where V2 may be greater than V1 and greater than $V_{ref}$. An electrical current I2 may flow through V2, as shown by an arrow 236, and be measured to determine a concentration of NO in the second cell 210, as further described below.

The second cell 210 of the first region 204 may be separated from the first cell 208 by a second diffusion barrier 226. The first diffusion barrier 214 and the second diffusion barrier 226 may be similarly configured to allow the exhaust gas to flow therethrough. Exhaust gas flow through the first diffusion barrier 214 and the second diffusion barrier 226 is shown by arrows 230. In another example, the first diffusion barrier 214 may allow the exhaust gas 212 to flow therethrough and the second diffusion barrier 226 may allow certain elements of the exhaust gas 212 to flow therethrough. For example, constituents of exhaust gas 212 such as $O_2$, $CO_2$, $H_2O$, NO, $NO_2$, $NH_3$, $H_2$, and CO may be able to enter the first cell 208 via the first diffusion barrier 214 while NO, $N_2$, $CO_2$, $H_2O$, and residual $O_2$ not pumped out by the first pair of electrodes are able to enter the second cell 210 via the second diffusion barrier 226.

Within the first cell 208 (e.g., between the first diffusion barrier 214 and the second diffusion barrier 226), the exhaust gas may undergo chemical reactions and oxygen may be reduced and electrochemically pumped out of the first cell 208 via the first electrode 218a, the ion-conducting body 202, and the second electrode 218b. Pumping of oxygen (e.g., oxygen anions, $O^{2-}$) out of the first cell 208 by the first electrode 218a and the second electrode 218b is shown by arrow 232. The oxygen may be electrochemically pumped out of the first cell 208 at a rate faster than a rate at which oxygen enters the first cell 208 via the first diffusion barrier 214. Chemical reactions in the first cell 208 may include the reactions of equations 1-5.

$$NO_2 \rightarrow NO + O \tag{1}$$

$$O_2 + CO \rightarrow CO_2 \tag{2}$$

$$O_2 + H_2 \rightarrow H_2O \tag{3}$$

$$O_2 + NH_3 \rightarrow NO + H_2O \tag{4}$$

$$O_2 \rightarrow 2O \tag{5}$$

The resulting NO (e.g., from equations 1 and 4) passes through the second diffusion barrier 226 into the second cell 210, where the NO molecules are dissociated on the NO decomposition electrodes to N and O. Oxygen is electrochemically pumped out of the second cell 210 via the fourth electrode 220b and the fifth electrode 224, as shown by arrow 234.

In this way, the NOx sensor may measure a concentration of NOx in the exhaust gas, as the current I2 due to the pumping of oxygen out of the second cell 210 by the voltage V2 applied to the third pair of electrodes may be proportional to a concentration of NOx in the exhaust gas. For example, if NO is present in the second cell 210, NO is dissociated by the NO decomposition electrode (e.g., the fifth electrode 224) into nitrogen and oxygen. The resulting oxygen is electrochemically pumped out of the second cell (e.g., by V2 applied to the third pair of electrodes as shown by arrow 234), resulting in the current I2. The value of I2 is proportional to NO present in the second cell 210 that is dissociated. However, as shown in equation 4, oxidation of $NH_3$ in the first cell 208 produces NO, thus the measured concentration of NOx based on the current I2 from pumping oxygen (e.g., oxygen produced from dissociation of NO in the exhaust gas and NO from $NH_3$ oxidation) out of the second cell 210 in the exhaust gas may be due to a concentration of $NO_2$ and/or $NH_3$.

The amperometric NOx sensor may respond in a reproducible manner to $NH_3$, although as mentioned above, the NOx sensor may not be able to distinguish between NOx and $NH_3$. Prior to exposure of the NOx sensor to $NH_3$ (e.g., prior to a first engine on event), a sensitivity factor of the NOx sensor to $NH_3$ relative to NOx may be determined, e.g., the sensitivity factor of the NOx sensor is provided by a manufacturer.

FIG. 3 shows a graph 300 illustrating an example bench measurement of NO and $NH_3$ by a NOx sensor, which may be used to determine a sensitivity factor of the NOx sensor. In one example, the graph 300 may be provided by a manufacturer. In another example, the graph 300 may be generated by the controller prior to a first engine-on event. For example, the NOx sensor may be the NOx sensor 200 of FIG. 2 and a gas mixture with known gas fractions may be supplied to the NOx sensor and used to assess a response and accuracy of the NOx sensor. In this example, the gas mixture may include predetermined fractions of NO and $NH_3$ as well as 10% $O_2$, 3% $H_2O$, and 3% $CO_2$. The graph 300 includes an ordinate representing NOx sensor output in ppm and an abscissa representing a concentration of both NO and $NH_3$ in ppm. A first line 302 represents NOx sensor output relative to concentration for NO, with data points shown as circles, and a second line 304 represents NOx sensor output relative to concentration for $NH_3$, with data points shown as triangles. For example, at data point 306, a sample including 200 ppm of $NH_3$ and 200 ppm of NO is provided to the NOx sensor, and, in response, the NOx sensor outputs a first reading of approximately 190 ppm NO and a second reading of approximately 210 ppm $NH_3$. A ratio of the second reading to the first reading is used to determine the sensitivity factor of the NOx sensor for $NH_3$ relative to NOx at a NOx concentration of 200 ppm. For example, in the graph 300, the sensitivity factor of the NOx sensor to $NH_3$ compared to NOx is approximately 1.1× at a NOx concentration of 200 ppm. As shown in the example of FIG. 3, the sensitivity factor of the NOx sensor to $NH_3$ may equal approximately 1.1× for each of the measured concentrations of NO and $NH_3$. In another example, the sensitivity factor may also be a function of temperature and exhaust flow velocity. As such, the relationships shown in graph 300 may be stored at a controller, e.g., the controller 12 of FIG. 1, and used to adjust the output of the $NH_3$ sensor. Furthermore, the sensitivity factor calculated from graph 300 may be used to calibrate an accuracy of the $NH_3$ sensor in monitoring $NH_3$ concentration in exhaust gases. For other examples of NOx sensors, the sensitivity factor may be greater than or less than 1.1× and may be different for each sensor.

When a NOx sensor is positioned downstream of an SCR system to determine whether the SCR system is slipping NOx and/or $NH_3$, differentiating between which of the NOx and $NH_3$ is slipping through the SCR system may be challenging, as described above. Determining a concentration of $NH_3$ using the NOx sensor may demand specific conditions, such as measurement in an absence of NOx, or specialized methods and the addition of a second NOx sensor, as described by Upadhyay et al. in U.S. Pat. No. 9,080,488B2. Still, estimations of $NH_3$ concentration may be inaccurate as $NH_3$ is indirectly measured by the NOx sensors.

Uncertainty in whether the NOx sensor is responding to NOx and/or $NH_3$ may be resolved by positioning a $NH_3$ sensor in close proximity to the NOx sensor, so that the $NH_3$ and NOx sensors may be exposed to the same exhaust gas compositions. The $NH_3$ sensor may directly measure a concentration of $NH_3$, where the NOx sensor may respond to both NOx and $NH_3$. In one example, the $NH_3$ sensor may be a "mixed-potential" sensor that may be tunable to be selective to (e.g., sense) different gas mixtures by changing an electrode composition of or applying a voltage to the mixed-potential sensor. In another example, the $NH_3$ sensor may include other $NH_3$ sensing technology.

Mixed-potential sensors as well as other conventional $NH_3$ sensing technologies may drift in their response to $NH_3$ over time, e.g., the $NH_3$ sensor accuracy may diminish over time and thus provide progressively less accurate estimations of $NH_3$ output by the vehicle. Inaccurate estimations of $NH_3$ output may indicate that the vehicle is outputting more $NH_3$ than is allowable per emissions standards. Additionally, if the estimated $NH_3$ output is lower than the actual $NH_3$ output, more $NH_3$ may be provided via an injection of urea into an exhaust stream near the SCR system catalyst to reduce NO to nitrogen ($N_2$), as described above in FIG. 1. Providing more $NH_3$ than is used by the SCR system to reduce NO may result in excess $NH_3$ being emitted to the atmosphere.

As shown in FIGS. 2-3, NOx sensors may measure both NOx and $NH_3$ concentrations in exhaust gas. The NOx sensor may have a known sensitivity factor to $NH_3$, which may be used to measure a concentration of $NH_3$ using the NOx sensor during zero NOx conditions. However, the method of measuring $NH_3$ concentration using the NOx sensor may restrict measurement of $NH_3$ concentration to zero NOx conditions. A method for measuring $NH_3$ concentrations during non-zero NOx conditions may include implementing a $NH_3$ sensor to directly measure $NH_3$ concentrations. However, $NH_3$ sensors may drift over time such that an accuracy of the $NH_3$ sensor output may decrease over time. A method is thus desired to adjust (e.g., correct) an output of the $NH_3$ sensor so that $NH_3$ concentration in exhaust gas can be more accurately sensed. This may be achieved using an NOx sensor placed in close proximity to the $NH_3$ sensor such that both sensors may measure exhaust gas samples with similar compositions. The cross sensitivity of the NOx sensor to $NH_3$ and NOx may be used to correct the $NH_3$ sensor output after drift of the $NH_3$ sensor. Additionally, the $NH_3$ sensor may be recalibrated (e.g., re-span and zeroed) such that the $NH_3$ sensor accuracy is reestablished and concentration of $NH_3$ in exhaust gas may be measured by the $NH_3$ sensor during both non-zero NOx conditions and zero NOx conditions. Adjustment of the $NH_3$ sensor output using the NOx sensor output and sensitivity factor is further described in FIGS. 4A-4B.

During zero NOx conditions, the NOx sensor may be operated nominally to measure exhaust gas concentrations, and it may be assumed that, in the absence of NOx, the NOx sensor output is a result of $NH_3$ in exhaust gas. An output of the $NH_3$ sensor for a measurement taken at the same time as the NOx sensor output may be adjusted based on the sensitivity factor of the NOx sensor.

The $NH_3$ response of an amperometric NOx sensor is known to be more stable over time than the response for a mixed-potential sensor, which may be used as a $NH_3$ sensor. In zero NOx conditions, e.g., instances where the gas composition is estimated to contain $NH_3$ but not NOx, the more stable response of the amperometric NOx sensor can be used to re-span the mixed potential $NH_3$ sensor. Zero NOx and zero $NH_3$ conditions may be estimated based on an engine operating state. For example, zero NOx conditions may be during a fuel cut (e.g., when fuel is not supplied to the engine) or during a low flow of exhaust gas and/or a low temperature condition of the SCR system with urea overdosing (e.g., where urea may not completely decompose during reduction of NOx). Determination of zero NOx and zero $NH_3$ conditions is further described below. Additionally, in zero $NH_3$ conditions, e.g., instances where the gas composition is estimated to be free of $NH_3$ (and $NO_2$), the mixed potential $NH_3$ sensor may be zeroed (e.g., a sensor output may be set to zero when $NH_3$ concentration is known to be zero). Thus, in zero NOx and zero $NH_3$ conditions, the amperometric NOx sensor can be used to calibrate (e.g., re-span and zero) the $NH_3$ sensor, in-situ, and increase the accuracy of the $NH_3$ sensor response. The higher accuracy of the $NH_3$ sensor response may increase an accuracy of the NOx sensor amperometric response with respect to detecting a specific gas mixture constituent including combinations of NOx and $NH_3$. e.g., the system may be able to more accurately determine a concentration of NOx and a concentration of $NH_3$ from the $NH_3$ sensor response and the NOx sensor response. Further details for adjusting the $NH_3$ sensor output based on NOx sensor readings during zero NOx conditions and the NOx sensitivity factor to $NH_3$ are described in FIGS. 4A-4B.

FIGS. 4A-4B illustrate a method 400 for adjusting an $NH_3$ sensor output based on an output of a NOx sensor during zero NOx conditions. Instructions for carrying out method 400 may be executed by a controller based on computer readable instructions stored on a memory of the controller and in conjunction with signals received from sensors of the engine system, such as the sensors described above with reference to FIG. 1. The controller may employ engine actuators of the engine system to adjust engine operation, according to the method described below.

As shown in FIG. 1, the NOx and $NH_3$ sensors are independently operated and positioned in close proximity to one another downstream of the SCR system relative to a direction of exhaust gas flow such that the NOx sensor and the $NH_3$ sensor sample exhaust gases from a similar location, which may result in the NOx sensor and the $NH_3$ sensor sampling exhaust gases with similar compositions, e.g., percentages of NOx, $NH_3$, $O_2$, etc.

Method 400 may be opportunistic, such that during engine operating events where zero NOx conditions and/or zero $NH_3$ conditions may occur, method 400 is executed. In another example, method 400 may be executed at a certain frequency programmed in the controller such that method 400 is intentionally executed when the controller sets conditions for performing $NH_3$ sensor correction according to method.

Additionally, as the NOx sensor sensitivity factor may be a function of temperature and exhaust flow velocity, an increase in SCR system temperature may trigger a request for adjusting the $NH_3$ sensor output. A request for adjusting the $NH_3$ sensor output may also be triggered by an increase in exhaust flow velocity, which may also change the NOx sensor sensitivity factor.

Under zero $NH_3$ conditions, method 400 includes updating a $NH_3$ sensor offset value correction. Under zero $NH_3$ and zero NOx conditions, method 400 includes zeroing the $NH_3$ sensor. Under non-zero $NH_3$ conditions and zero NOx conditions, if an average NOx sensor output value and an average $NH_3$ sensor output value are less than a first threshold and a second threshold, respectively, readings of the $NH_3$ sensor and the NOx sensor may be too low to compute a reliable $NH_3$ sensor gain value correction. Under non-zero $NH_3$ conditions and zero NOx conditions, if an average NOx sensor output value and an average $NH_3$ sensor output value are greater than a first threshold and a second threshold, respectively, method 400 includes updating the $NH_3$ sensor gain value correction, adjusting outputs of the $NH_3$ sensor, and re-spanning the $NH_3$ sensor. Under non-zero $NH_3$ conditions and non-zero NOx conditions, method 400 includes actively generating zero NOx conditions and zero $NH_3$ conditions used to calibrate (e.g., zero and re-span) the $NH_3$ sensor and adjust the $NH_3$ sensor outputs.

Beginning with FIG. 4A, at 402, method 400 includes starting a vehicle and monitoring engine operating conditions. The vehicle may be the vehicle 5 described in FIG. 1. Vehicle start at 402 may be initiated in response to an ignition key being turned, a button being depressed on a key fob or a vehicle instrument panel, indication via a smart device (such as a phone), and the like. Vehicle start may include cranking an engine, injecting fuel to combustion chambers, providing power to an electric machine from a battery, etc. Engine operating conditions may include, for example, operator torque demand, engine speed, vehicle speed, engine coolant temperature (ECT), engine head temperature (EHT), engine load, ambient conditions (such as ambient humidity, temperature, and barometric pressure), exhaust temperature, manifold pressure, manifold air flow, battery state of charge, crankshaft position, fuel rail pressure, a status of a fuel injector, etc.

At 404, method 400 includes determining if zero $NH_3$ conditions are met, where zero $NH_3$ conditions include conditions where a concentration of $NH_3$ in exhaust gas is zero. One example of zero $NH_3$ conditions includes urea injector deactivation. In another example, zero $NH_3$ conditions may include a vehicle cold start, for example, an engine temperature (e.g., engine coolant temperature) being less than a desired temperature or less than an ambient temperature, or a temperature of the SCR system being less than a catalyst light-off temperature. Another example of zero $NH_3$ conditions may include passage of a duration of time subsequent to vehicle start when catalyst (SCR) temperature transitions from a high temperature to a low temperature. A further example of zero $NH_3$ conditions may be a time when the SCR system operates at high temperatures such as, for example, during diesel particulate filter (DPF) regeneration, e.g., regeneration of the catalyst filter upstream of the SCR system.

If, at 404, it is determined that zero $NH_3$ conditions are met, at 406, method 400 includes reading the $NH_3$ sensor and averaging a number of $NH_3$ sensor outputs to calculate a first average $NH_3$ sensor output value, $NH_{3\_}avg$. In one example, method 400 may include reading and averaging 3, 5, 7, or 10 $NH_3$ sensor outputs.

At 408, method 400 includes determining if a $NH_3$ offset is present, in other words, if the $NH_3$ sensor has drifted. The $NH_3$ offset is a value by which the $NH_3$ sensor output is greater than or less than an output which accurately indicates a level of $NH_3$ in the exhaust gas. For example, the $NH_3$ offset is an estimated amount that the sensor output deviates from an actual $NH_3$ level. Thus, when the zero $NH_3$ conditions are confirmed, in one example, the $NH_3$ offset may indicate an erroneous positive $NH_3$ output when no $NH_3$ is flowing through the exhaust passage.

Presence of a $NH_3$ offset may be determined by multiplying the first $NH_{3\_}avg$ value by a first filter gain value, e.g., between zero and one to allow filtering of multiple events. For example, the first filter gain value may be a low pass filter gain for the $NH_3$ offset. If the resulting $NH_3$ offset is a non-zero value, the $NH_3$ sensor may have drifted.

At 410, it is determined a $NH_3$ offset is not present (e.g., the $NH_3$ sensor may not have drifted) and method 400 includes maintaining operating conditions and method 400 may end.

At 412, if it is determined at 408 that a $NH_3$ offset is present (e.g., the $NH_3$ sensor may have drifted), method 400 includes updating an $NH_3$ sensor offset value correction using equation 6, shown below. Equation 6 may be used to calculate $NH_{3\_}offset(k+1)$, e.g., the $NH_3$ sensor offset at time k+1, where k+1 occurs after time k. K denotes a previous $NH_3$ sensor offset value correction and the current $NH_3$ sensor offset value correction is denoted by k+1. $NH_{3\_}offset(k+1)$ is determined based on the $NH_3$ sensor offset at time k, (e.g., the $NH_3$ offset calculated at 408 or a prior $NH_3$ offset) the first average $NH_3$ sensor output value calculated at 406, and fac_filt1. Equation 6 may also be used to calculate following (e.g., subsequent) $NH_3$ sensor offset value corrections, e.g., k+2, k+3, etc. The $NH_{3\_}offset(k)$, $NH_{3\_}offset(k+1)$, and the following $NH_3$ sensor offset value corrections are stored in non-transitory memory of the system, for example, of the controller 12 of FIG. 1.

$$NH_{3\_}offset(k+1)=NH_{3\_}offset(k)+fac\_filt1*NH_{3\_}avg \quad (6)$$

At 414, method 400 includes determining if zero NOx conditions are met, where zero NOx conditions include conditions where a concentration of NOx in exhaust gas is zero. One example of zero NOx conditions includes when zero NOx is generated by the engine. In another example, zero NOx conditions include a fuel cut event, e.g., when fuel is not being supplied to the combustion chamber during deceleration. In an example where the vehicle is a hybrid-electric vehicle configured with a diesel engine and at least one electric motor, zero NOx conditions may include conditions where the vehicle is powered by the electric motor and the engine is stopped. Zero NOx conditions may also include during engine stops during stop/start vehicle operation. Another example of zero NOx conditions may be during a low flow of exhaust gas and/or a low temperature condition of the SCR system with urea overdosing (e.g., where urea may not completely decompose during reduction of NOx). During zero NOx conditions, $NH_3$ may be a source of nitrogen (N) in exhaust gas flowing through the SCR system and therefore being sensed by the NOx sensor.

If zero NOx conditions are not met at 414, method 400 proceeds to 416 to actively generate zero NOx conditions. For example, zero NOx conditions may be generated by executing an engine control action including adjusting cam timing for low exhaust gas flow, or commanding the urea injector to provide an overdose of urea (e.g., more urea than may be used to reduce NOx in exhaust gas) and the SCR system may be maintained at a low temperature.

If zero NOx conditions are determined at 414, method 400 proceeds to 418, where method 400 includes zeroing the $NH_3$ sensor. Method 400 also proceeds from 416 to 418, as zero NOx conditions have been actively generated at 416. As described above, zeroing the $NH_3$ sensor may be one method of calibrating the $NH_3$ sensor which includes setting an $NH_3$ sensor output to zero when $NH_3$ concentration is known to be zero, as determined at 404. Calibrating the $NH_3$ sensor by zeroing may establish accuracy of the $NH_3$ sensor for future readings of $NH_3$ concentration in exhaust gas, as the $NH_3$ sensor output set at zero may be used as a reference point for future readings. Method 400 ends.

Returning to 404, if it is determined zero $NH_3$ conditions are not met (e.g., $NH_3$ may be present in exhaust gas), method 400 proceeds to 420 of FIG. 4B. At 420, method 400 includes re-spanning the $NH_3$ sensor and adjusting $NH_3$ sensor outputs without zero $NH_3$ conditions, to be further described in FIG. 4B.

At 422, method 400 includes determining if zero NOx conditions are met, as described prior in method 400. If zero NOx conditions are not met, e.g., NOx is present in exhaust gas, at 424, method 400 includes maintaining operating conditions. As both NOx and $NH_3$ may be present in exhaust gas due to the absence of both zero NOx conditions and zero $NH_3$ conditions, respectively, the NOx sensor output may indicate a combined concentration of $NH_3$ and NOx and therefore using the NOx sensor output to re-span the $NH_3$ sensor and to adjust $NH_3$ sensor outputs may result in inaccurate re-spanning and adjusting. The $NH_3$ sensor may be accurately re-span and the $NH_3$ sensor outputs may be accurately adjusted during zero NOx conditions.

At 426, method 400 includes determining if greater than a threshold duration has elapsed since a previous occurrence of zero NOx conditions. If a time since the previous occurrence of zero NOx conditions has not exceeded the threshold duration, method 400 returns to 424. If a time since the previous occurrence of zero NOx conditions has exceeded the threshold duration, at 428, method 400 includes actively generating zero NOx conditions. Zero NOx conditions may be actively generated as described at 416 of method 400.

If, at 422, it is determined that zero NOx conditions are met, at 430, method 400 includes reading the $NH_3$ sensor and averaging a number of $NH_3$ sensor outputs to calculate a second average $NH_3$ sensor output value, $NH_{3\_}avg$. In one example, method 400 may read and average 3, 5, 10, 20, etc. $NH_3$ sensor outputs Upon actively generating zero NOx conditions at 428, method 400 also proceeds to 430.

At 432, method 400 includes reading the NOx sensor and averaging a number of NOx sensor outputs to calculate an average NOx sensor output valve, $NOx\_avg$. In one example, 3, 5, 10, 20, etc. NOx sensor outputs may be averaged. For example, as described above in FIG. 2, the NOx sensor output may indicate a concentration or percentage of $NH_3$ in the exhaust gas based on a current, such as I2, corresponding to the concentration of oxygen pumped out of the second cell, where the current is proportional to a concentration of $NH_3$ in the exhaust gas. As the NOx sensor may sense NOx and $NH_3$, in the presence of $NH_3$ and the absence of NOx (e.g., during zero NOx conditions), the NOx sensor output may indicate a concentration of $NH_3$ in exhaust gas.

At 434, method 400 includes determining if the $NOx\_avg$ is less than a first threshold. The first threshold may be a positive, non-zero concentration of $NH_3$ used to determine if the NOx sensor measures a sufficient reading of $NH_3$ to be used to adjust the $NH_3$ sensor output. For example, the sufficient reading may be a concentration of $NH_3$ that is large enough such that NOx sensor noise may not be amplified. If the $NH_3$ concentration is low, noise from the NOx sensor may be amplified during calculations used to adjust the $NH_3$ sensor output, as described below, which may result in an inaccurate adjustment.

If at 434 NOx_avg is less than the first threshold, at 436, method 400 includes determining if the $NH_3$ sensor measures a sufficient reading of $NH_3$ to be used to adjust the $NH_3$ sensor output, to be further described in subsequent steps of method 400. At 438, method 400 includes determining if the second $NH_3$_avg is less than a second threshold. The second threshold may be similar to the first threshold and may be a positive, non-zero concentration of $NH_3$ used to determine if the $NH_3$ sensor measures a sufficient reading of $NH_3$ to be used to adjust the $NH_3$ sensor output. For example, the sufficient reading may be a concentration of $NH_3$ that is large enough such that $NH_3$ sensor noise may not be amplified. If the $NH_3$ concentration is low, noise from the $NH_3$ sensor may be amplified during calculations used to adjust the $NH_3$ sensor output, as described below, which may result in an inaccurate adjustment.

If at 438, it is determined than $NH_3$_avg is less than the second threshold, at 440, method 400 determines readings of the $NH_3$ sensor and readings of the NOx sensor are too low to compute a reliable $NH_3$ sensor gain value correction. For example, NOx_avg being less than the first threshold and $NH_3$_avg being less than the second threshold during zero NOx conditions and non-zero $NH_3$ conditions may indicate a concentration of $NH_3$ in the exhaust gas is not high enough to be indicate $NH_3$ slip through the SCR. Additionally, the concentration of $NH_3$ may not be high enough to suppress calculation error caused by sensor noise, which may result in inaccurate adjustment of the $NH_3$ sensor output. Method 400 may return to 404 of FIG. 4A to determine if zero $NH_3$ conditions are met and to reevaluate conditions for recalibrating (e.g., re-spanning and/or zeroing) and adjusting $NH_3$ sensor outputs according to method 400.

If at 438, it is determined that $NH_3$_avg is not less than the second threshold, method 400 returns to 432 to read the NOx sensor and average readings to compute a second NOx_avg. $NH_3$_avg being greater than the second threshold may indicate $NH_3$ slip through the SCR, as $NH_3$ concentration in the exhaust gas is greater than the second threshold. Additionally, $NH_3$_avg being greater than the second threshold may indicate a concentration of $NH_3$ is large enough such that calculation error due to sensor noise may not affect adjustment accuracy. However, since it is determined at 434 that NOx_avg is less than the first threshold, the concentration of $NH_3$ measured by the NOx sensor may be too low to mitigate calculation error due to noise. Method 400 proceeds as described above to determine if the second NOx_avg is less than the first threshold. A repetition from 438 to 434 may be repeated until NOx_avg is determined to not be less than the first threshold, at which point method 400 proceeds to 442.

If it is determined that NOx_avg is not less than the first threshold, at 442, method 400 includes determining if the $NH_3$ sensor measures a sufficient reading of $NH_3$ to be used to accurately adjust the $NH_3$ sensor output to be further described in subsequent steps of method 400. At 444, method 400 includes determining if $NH_3$_avg is less than the second threshold, as described at 438. If at 444 it is determined $NH_3$_avg is less than the second threshold, the concentration of $NH_3$ measured by the $NH_3$ sensor may not be high enough to suppress calculation error caused by sensor noise, which may result in inaccurate adjustment of the $NH_3$ sensor output. At 446, method 400 includes maintaining operating conditions.

If at 444 it is determined $NH_3$_avg is not less than the second threshold, a concentration of $NH_3$ may be detected by the $NH_3$ sensor which may be large enough such that calculation error due to sensor noise may not affect adjustment accuracy. When both $NH_3$_avg and NOx_avg are greater than the second threshold and the first threshold, respectively, method 400 includes re-spanning the $NH_3$ sensor and correcting $NH_3$ sensor outputs, as further described by method 400. At 448, method 400 includes updating a $NH_3$ sensor gain value correction, $NH_3$_gain(k). The $NH_3$ gain is the level of sensitivity the $NH_3$ sensor has to $NH_3$, for example, an amount the $NH_3$ sensor output changes corresponding to a change in the concentration of $NH_3$. For example, when $NH_3$ accurately reads the $NH_3$ concentration in exhaust gas, $NH_3$_gain(k) may be one. In another example, when the $NH_3$ sensor output reports a greater $NH_3$ concentration than is present, $NH_3$ gain(k) may be greater than one and when the $NH_3$ sensor output reports a lesser concentration of $NH_3$ than is present, $NH_3$ gain may be less than one.

Equation 7, shown below, may be used to determine $NH_3$_gain(k+1), e.g., the $NH_3$ sensor gain at time k+1, where k+1 occurs after time k. K denotes a previous $NH_3$ sensor gain value correction and the current $NH_3$ sensor gain value correction is denoted by k+1. $NH_3$_gain(k+1) is determined using several variables, including the $NH_3$ sensor gain $NH_3$_gain (k) at time k, fac_filt2, which is a second filter gain value, e.g., filtering a $NH_3$ gain bias learned over multiple events, where the fac_filt2 value between zero and one to allow filtering of multiple events (e.g., subsequent zero NOx conditions), fac_sns, which is a sensitivity factor of the NOx sensor to $NH_3$ as described in FIG. 3, NOx_avg as determined at 432, the second $NH_3$_avg as determined at 430, and $NH_3$_offset(k) as determined during prior executions of method 400. Equation 7 may also be used to calculate following $NH_3$ sensor gain value corrections, e.g., k+2, k+3, etc. $NH_3$_gain(k), $NH_3$ gain(k+1), and following $NH_3$ sensor gain value corrections, e.g., k+2, k+3, etc., are stored in non-volatile memory of the system, for example, of the controller 12 of FIG. 1.

$$NH_3\_gain(k+1) = NH_3\_gain(k) + fac\_filt2 * fac\_sns * NOx\_avg/(NH_3\_avg - NH_3\_offset(k)) \quad (7)$$

For example, Equation 7 calculates $NH_3$ gain(k+1) to be the ratio of the NOx sensor reading (NOx_avg) over the $NH_3$ sensor reading ($NH_3$_avg), where the $NH_3$ sensor reading is corrected for the most recent offset estimate and the NOx sensor reading is corrected for the sensitivity of the NOx sensor to $NH_3$. The ratio is further low pass filtered (fac_filt2) to reduce an effect of noise on the measurements.

At 450, method 400 includes collecting a $NH_3$ sensor output to obtain a current reading of $NH_3$ concentration in the exhaust passage. As described above, the $NH_3$ sensor output may indicate a concentration of $NH_3$ in the exhaust gas. The $NH_3$ sensor output may be stored as $NH_3$_raw, as the $NH_3$ sensor output may have yet to be corrected.

At 452, method 400 includes calculating a corrected $NH_3$ sensor output value, $NH_3$_cor. Equation 8 is used to calculate $NH_3$_cor using $NH_3$_gain(k+1), $NH_3$_offset(k+1), and $NH_3$_raw, where $NH_3$_raw is the $NH_3$ sensor output collected at 426.

$$NH_3\_cor = NH_3\_gain(k+1) * NH_3\_raw + NH_3\_offset(k+1) \quad (8)$$

At 454, when the system is under zero NOx conditions as determined at 422, method 400 includes re-spanning the $NH_3$ sensor output based on the NOx sensor sensitivity factor. As described in FIG. 3, the NOx sensor may have a different sensitivity to $NH_3$ compared to NOx, which may result in the NOx sensor outputting a higher concentration value of $NH_3$ than is present in the exhaust gas. Re-spanning the $NH_3$ sensor output may include adjusting the $NH_3$ sensor output (e.g., the $NH_3$ sensor output equal to the NOx sensor output) by the ratio of the NOx sensor reading (NOx_avg) over the $NH_3$ sensor reading ($NH_3$_avg), where the $NH_3$ sensor reading is corrected for the most recent offset estimate and the NOx sensor reading is corrected for the sensitivity of the NOx sensor to $NH_3$. The ratio is further low pass filtered (fac_filt2) to reduce the effect of noise on the measurements. This calculation, as shown in equation 7, may re-span the $NH_3$ sensor such that the updated $NH_3$ sensor output may accurately report $NH_3$ concentrations in exhaust gas.

At 456, method 400 includes actively generating zero $NH_3$ conditions. As 420-456 of method 400 are conducted during non-zero $NH_3$ conditions, as indicated at 404, actively generating zero $NH_3$ conditions at 456 may allow for calibration (e.g., zeroing) of the $NH_3$ sensor. Zero $NH_3$ conditions may be generated by executing an engine control action. For example, a transition of the SCR system from a high temperature to a low temperature may be commanded by the controller, or the SCR system may be maintained at a high operating temperature, as described above. Method 400 returns to 406 of FIG. 4A and proceeds through method 400 as described above to zero the $NH_3$ sensor. Method 400 ends.

As a result of the $NH_3$ sensor being corrected, levels of $NH_3$ injected as urea may be adjusted to more efficiently reduce NOx in the SCR system. Adjusting the $NH_3$ sensor output using the NOx sensor output and the sensitivity factor of the NOx sensor to $NH_3$ may restore and/or maintain accuracy of the $NH_3$ sensor for monitoring $NH_3$ levels output by a vehicle. Accurate measurements of $NH_3$ in exhaust gas may result in more efficient reduction of NOx by the SCR system, as the amount of $NH_3$ injected to the SCR system as urea may be calibrated closer to stoichiometric based on engine NOx output and a load of ammonia stored in the SCR system. For example, the controller may receive a signal from the $NH_3$ sensor, such as the corrected $NH_3$ sensor output value, and may determine a control signal to send to a urea injector actuator to inject an amount of $NH_3$ as urea based on the corrected $NH_3$ sensor output value. The amount of $NH_3$ injected as urea may be further determined based on temperature of the SCR system and an air fuel ratio (AFR). For example, a lean AFR results in higher NOx concentration in exhaust gas. Cold SCR system temperatures also result in higher NOx concentration in exhaust gas. Higher concentrations of NOx in exhaust gas may result in the SCR using higher concentrations of $NH_3$ to reduce the NOx concentration.

In this way, $NH_3$ sensor accuracy may be restored and maintained as $NH_3$ sensor accuracy experiences drift over time. $NH_3$ concentration in exhaust gas may be directly measured by the $NH_3$ sensor, which may result in a more accurate measurement than a measurement of $NH_3$ by a NOx sensor. In addition to adjusting individual outputs (e.g., each reading) of the $NH_3$ sensor, using the NOx sensor output and sensitivity factor to calibrate (e.g., zero and re-span) the $NH_3$ sensor may allow for more stable NOx and $NH_3$ determination, as accuracy of the $NH_3$ sensor may be restored.

The technical effect of adjusting a $NH_3$ sensor output using a NOx sensor output and a sensitivity factor of the NOx sensor to $NH_3$ is that an amount of $NH_3$ injected into the SCR system may be adjusted to efficiently reduce NOx in exhaust gas while also reducing NOx and $NH_3$ slip through the SCR system to the atmosphere.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In a further example, the present disclosure includes a system for an engine system, comprising a NOx sensor, a $NH_3$ sensor, an exhaust aftertreatment device, an electric machine, and a controller configured with computer readable instructions stored on non-transitory memory that when executed, cause the controller to correct an output of the $NH_3$ sensor output based on readings by the NOx sensor during zero NOx conditions, the NOx sensor having a sensitivity factor to $NH_3$ as a function of temperature and exhaust flow velocity.

The disclosure also provides support for a method, comprising: adjusting an output of an ammonia (NH3) sensor based on readings of a nitrogen oxide (NOx) sensor during zero NOx conditions, the NOx sensor having a sensitivity factor to NH3 as a function of exhaust gas temperature and exhaust flow velocity, to maintain an accuracy of the NH3 sensor. In a first example of the method sensor operates independently of the NOx sensor, and wherein the NH3 sensor is located near the NOx sensor downstream of an exhaust aftertreatment device relative to a direction of exhaust gas flow to expose the NOx sensor and the NH3 sensor to exhaust gas from a same region of an exhaust passage. In a second example of the method, optionally including the first example, the exhaust aftertreatment device is a selective catalytic reduction (SCR) system. In a third example of the method, optionally including one or both of the first and second examples, outputs of the NOx sensor indicate a concentration of nitric oxide (NO) in exhaust gas in response to at least one of NOx and NH3 in exhaust gas. In a fourth example of the method, optionally including one or more or each of the first through third examples, zero NOx conditions include conditions where NOx is not present in exhaust gas. In a fifth example of the method, optionally including one or more or each of the first through fourth examples, adjusting the output of the NH3 sensor includes adjusting each reading of the NH3 sensor using an NH3 sensor offset value and a NH3 sensor gain value. In a sixth example of the method, optionally including one or more or each of the first through fifth examples sensor gain value is updated using the sensitivity factor of the NOx sensor and the NH3 sensor offset value. In a seventh example of the method, optionally including one or more or each of the first through sixth examples sensor offset value is updated during zero NH3 conditions. In an eighth example of the method, optionally including one or more or each of the first through seventh examples conditions include conditions where NH3 is not present in exhaust gas. In a ninth example of the method, optionally including one or more or each of the first through eighth examples conditions and zero NOx conditions are actively generated by engine control actions when a threshold duration has elapsed since a previous occurrence of zero NH3 conditions or zero NOx conditions. In a tenth example of the method, optionally including one or more or each of the first through ninth examples, the method further comprises: calibrating the NH3 sensor during zero NOx conditions. In an eleventh example of the method, optionally including one or more or each of the first through tenth examples, calibrating the NH3 sensor further includes re-spanning the output of the NH3 sensor by a ratio of a first value of averaged NOx sensor outputs over a second value of averaged NH3 sensor outputs, where the second value is adjusted by the NH3 sensor offset value, the first value is adjusted by the sensitivity factor of the NOx sensor, and the ratio is further low pass filtered.

The disclosure also provides support for a system for an engine system, comprising: a NOx sensor, a NH3 sensor positioned proximate to the NOx sensor, an exhaust aftertreatment device located upstream of the NOx sensor and the NH3 sensor, and a controller configured with computer readable instructions stored on non-transitory memory that when executed, cause the controller to: adjust an output of the NH3 sensor based on readings by the NOx sensor during zero NOx conditions, the NOx sensor having a sensitivity factor to NH3 as a function of temperature and exhaust flow velocity to maintain an accuracy of the NH3 sensor. In a first example of the system, the NOx sensor is configured to sense NOx and NH3. In a second example of the system, optionally including the first example, the exhaust aftertreatment device is a selective catalytic reduction (SCR) system configured with an upstream particulate filter. In a third example of the system, optionally including one or both of the first and second examples, the NOx sensor and the NH3 sensor are positioned downstream of the SCR system and exposed to exhaust gas from a same region of an exhaust passage. In a fourth example of the system, optionally including one or more or each of the first through third examples, a urea injector is positioned between the particulate filter and the SCR system to selectively inject urea onto the SCR system. In a fifth example of the system, optionally including one or more or each of the first through fourth examples, an amount of urea injected onto the SCR system is based on a corrected NH3 sensor output value.

The disclosure also provides support for a method for determining ammonia (NH3) levels output by a vehicle, comprising: during zero NOx conditions: correcting a NH3 sensor output based on a nitrogen oxide (NOX) sensor output and a NOx sensor sensitivity factor to NH3 by: calculating an average NH3 sensor output value, calculating an average NOx sensor output value, correcting a NH3 sensor offset value, correcting a NH3 sensor gain value, calculating a corrected NH3 sensor output value using the NH3 sensor offset value and NH3 sensor gain value, and adjusting an amount of urea injected at a selective catalytic reduction system based on the corrected NH3 sensor output value. In a first example of the method, the method further comprises: zeroing the NH3 sensor during zero NH3 and zero NOx conditions and re-spanning the NH3 sensor based on the NOx sensor sensitivity factor during zero NOx conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting an output of an ammonia ($NH_3$) sensor based on readings of a nitrogen oxide (NOx) sensor during zero NOx conditions, the NOx sensor having a sensitivity factor to $NH_3$ as a function of exhaust gas temperature and exhaust flow velocity, to maintain an accuracy of the $NH_3$ sensor, wherein adjusting the output of the $NH_3$ sensor includes adjusting each reading of the $NH_3$ sensor using an $NH_3$ sensor offset value and an $NH_3$ sensor gain value; calculating a corrected $NH_3$ sensor output value based on the adjusted output of the $NH_3$ sensor; and controlling a urea injector actuator to inject an amount of $NH_3$ based on the corrected $NH_3$ sensor output value.

2. The method of claim 1, wherein the $NH_3$ sensor operates independently of the NOx sensor, and wherein the $NH_3$ sensor is located near the NOx sensor downstream of an exhaust aftertreatment device relative to a direction of exhaust gas flow to expose the NOx sensor and the $NH_3$ sensor to exhaust gas from a same region of an exhaust passage.

3. The method of claim 2, wherein the exhaust aftertreatment device is a selective catalytic reduction (SCR) system.

4. The method of claim 1, wherein outputs of the NOx sensor indicate a concentration of nitric oxide (NO) in exhaust gas in response to at least one of NOx and $NH_3$ in exhaust gas.

5. The method of claim 1, wherein zero NOx conditions include conditions where NOx is not present in exhaust gas.

6. The method of claim 1, wherein the $NH_3$ sensor gain value is updated using the sensitivity factor of the NOx sensor and the $NH_3$ sensor offset value.

7. The method of claim 1, wherein the $NH_3$ sensor offset value is updated during zero $NH_3$ conditions.

8. The method of claim 7, wherein zero $NH_3$ conditions include conditions where $NH_3$ is not present in exhaust gas.

9. The method of claim 7, wherein zero $NH_3$ conditions and zero NOx conditions are actively generated by engine control actions when a threshold duration has elapsed since a previous occurrence of zero $NH_3$ conditions or zero NOx conditions.

10. The method of claim 7, further comprising calibrating the $NH_3$ sensor during zero NOx conditions.

11. The method of claim 10, wherein calibrating the $NH_3$ sensor further includes re-spanning the output of the $NH_3$ sensor by a ratio of a first value of averaged NOx sensor outputs over a second value of averaged $NH_3$ sensor outputs, where the second value is adjusted by the $NH_3$ sensor offset value, the first value is adjusted by the sensitivity factor of the NOx sensor, and the ratio is further low pass filtered.

12. The method of claim 7, wherein updating the $NH_3$ sensor offset value during zero $NH_3$ conditions comprises:
determining an average $NH_3$ value during the zero $NH_3$ conditions based on a plurality of output values of the $NH_3$ sensor during the zero $NH_3$ conditions;
filtering the average $NH_3$ value; and
adding the filtered average $NH_3$ value to a prior $NH_3$ sensor offset value.

13. The method of claim 1, wherein adjusting each reading of the $NH_3$ sensor using the $NH_3$ sensor offset value and the $NH_3$ sensor gain value comprises, for a first reading of the $NH_3$ sensor that includes a raw $NH_3$ value:
multiplying the raw $NH_3$ value by the $NH_3$ sensor gain value to calculate a corrected $NH_3$ value; and
adding the corrected $NH_3$ value to the $NH_3$ sensor offset value.

14. The method of claim 1, wherein the NOx sensor is an amperometric sensor and the $NH_3$ sensor is a mixed-potential sensor.

15. The method of claim 1, wherein the zero NOx conditions comprise a fuel cut operation.

* * * * *